United States Patent
Browning et al.

(10) Patent No.: US 6,820,803 B1
(45) Date of Patent: Nov. 23, 2004

(54) CASH CARD SYSTEM

(76) Inventors: Lucas T. Browning, 3222 Evergreen Way, Ellicott City, MD (US) 21042; W. Clark Gaughan, 3323 Governor Carroll Ct., Ellicott City, MD (US) 21043; Charles L. Browning, 76 Genesee St., P.O. Box 237, Greene, NY (US) 13778

( * ) Notice: Subject to any disclaimer, the term of this patent is extended or adjusted under 35 U.S.C. 154(b) by 0 days.

(21) Appl. No.: 10/230,439

(22) Filed: Aug. 30, 2002

(51) Int. Cl.$^7$ ............................................. G06F 17/60
(52) U.S. Cl. ....................... 235/380; 235/381; 235/441; 235/382; 705/50; 705/64
(58) Field of Search ................. 235/382, 380, 235/441, 381, 379, 493; 705/50, 64, 38, 35, 39; 335/381

(56) References Cited

U.S. PATENT DOCUMENTS

| | | | |
|---|---|---|---|
| 5,577,109 A | * 11/1996 | Stimson et al. | 379/114.2 |
| 5,918,909 A | * 7/1999 | Fiala et al. | 283/61 |
| 5,953,710 A | * 9/1999 | Fleming | 705/38 |
| RE36,365 E | * 11/1999 | Levine et al. | 235/380 |
| 6,115,458 A | * 9/2000 | Taskett | 379/114.2 |
| 6,243,450 B1 | * 6/2001 | Jansen et al. | 379/144.01 |
| 6,267,292 B1 | * 7/2001 | Walker et al. | 235/379 |
| 6,273,335 B1 | * 8/2001 | Sloan | 235/380 |
| 6,434,379 B1 | * 8/2002 | Despres et al. | 455/406 |
| 6,454,165 B1 | * 9/2002 | Dawson | 235/381 |
| 6,473,500 B1 | * 10/2002 | Risafi et al. | 379/144.01 |
| 2001/0003471 A1 | * 6/2001 | Whitworth | 705/64 |
| 2002/0009960 A1 | * 1/2002 | Sosa et al. | 705/39 |
| 2003/0008976 A1 | * 1/2003 | Burger et al. | 705/50 |

* cited by examiner

*Primary Examiner*—Thien M. Le
*Assistant Examiner*—Allyson N Trail
(74) *Attorney, Agent, or Firm*—Mark Levy & Associates; David L. Banner

(57) ABSTRACT

A cash card system featuring an electronic element providing a mechanism for making a cash purchase or payment. The electronic element contains a PIN and electronic cash, and is useless by itself. Only the correct PIN will validate a purchase. The account number encoded on the electronic element is tied to the PIN, such that the loss or theft of the electronic element will prevent unauthorized usage. The user purchases a dollar amount for the electronic element, which is electronically loaded therein. Thereafter, the user transfers the electronic cash to a retailer or a financial institution by providing the PIN.

17 Claims, No Drawings

CASH CARD SYSTEM

FIELD OF THE INVENTION

This invention pertains to a cash card system and, more particularly, to a cash card system providing a substitute for carrying and using currency, and affords the user both security and anonymity.

BACKGROUND OF THE INVENTION

Everyone is acutely aware of the drawbacks of using or carrying cash in order to obtain goods and services. Cash is easily lost, stolen, or counterfeited. Credit cards are not much better than cash, because they too can be lost, stolen, or counterfeited. One of the advantages of using a credit card is that liability to the individual is often limited to a relatively small, predetermined amount (e.g., $50), but only if the loss is realized and reported promptly. Additionally, losses incurred by the banks are passed on to the cardholders in the form of higher fees and interest payments. It is obvious that a better card transaction system is needed.

Most recently, the use of cash cards has had some success, particularly in Europe. Cash cards, however, have similar problems to other credit card systems.

The present invention seeks to provide an improved cash card system substantially eliminating the need to use cash, that is safer and more convenient to use.

The cash card system of the current invention uses two cards: a cash card that is related to a second, security card. A magnetic stripe or chip on the back of the cash card contains the requisite information for making a purchase of goods or services at participating retailers. The security card is presented at any bank to obtain a refund for the cash contained in a stolen or lost cash card.

At the time of initial purchase of the cards from a vendor, like a bank, the purchaser is provided with a cash card containing an account number and an encoded or encrypted PIN number selected by the cardholder and known only to him or her. The purchaser selects and pays for the monetary value that is then entered into the cash card system. The card containing the selected PIN number and the account number is then activated as an authorization card for the cash card system.

The user purchases a dollar amount for the cash card, which is electronically loaded therein. This procedure is similar to telephone card systems allowing minutes to be pre-purchased. The cash card can also be used to encode the amount used in the course of purchasing goods and services, in another embodiment. The purchaser pays for the electronic cash by cash, check, or electronic transfer of funds. No identification by the purchaser is required to purchase the cash card, thus preserving anonymity. Once the second card is electronically loaded, the user can then use the cash card at any participating sales establishment simply by using the purchaser-assigned PIN to approve purchases. The user types in the PIN to activate and approve the purchase using the cash card. The approval for the purchase can be verified by subscribing retailers, who swipe the cash card through a card reading machine in order to verify that the PIN number is correct, and to debit the cash needed for the purchase. The amount of the purchase is immediately electronically approved and debited from the cash card. A running balance is maintained for the account held with the issuing bank or agency.

In the event of loss or theft, the cash card cannot be used without entering the proper and correct PIN number assigned by the cardholder at the time of purchase. A refund of the cash remaining in the account is obtained by presenting the security card to the subscribing issuer and verifying the PIN number contained therein. Therefore, either card is useless without the PIN. People using the card system will be instructed to keep the cards separated upon their person, or to leave the identification card at home, in order to foil theft and misappropriation. The PIN number will be encrypted and encoded on both the identification card and the cash card, so it will be difficult to determine the PIN without prior knowledge. The security card is used only to retrieve funds from the lost/stolen cash card. This feature keeps others from using the cash card without authorization from the purchaser.

Should the cash card fall into alien hands, its use would be prohibited by virtue of the need for the correct PIN, which must accompany the use of the card when making a purchase.

In the event of loss of either card, notifying the issuing bank or agency can void each card. A new cash card and/or a new identity card with a new PIN can then be issued to the user.

A lost cash card that has been partially used can be replaced with a new card loaded with the remainder of the funds, because a running balance is maintained by the issuing bank or agency. The transaction information at the time of each purchase is recorded so a running balance can be determined after each use of the card.

The cash card system of this invention affords persons anonymity and security. The user enjoys the same anonymity and protections of cash purchases without having to carry cash. The user also enjoys the convenience and freedom of card usage (e.g., paying at the gas pump). A user need not apply for credit and is not subject to "hits" on his or her credit records. The government, retailers, or other institutions cannot easily track purchases, card usage, its purposes, or the transaction locations, with respect to a specific individual. However, the individual can keep a running balance of his or her purchases.

Internet purchases are protected because PINs are required when using the card. Because the card system does not require any identification to purchase and/or use the cash card, it further protects a person's identity by maintaining the identifying PIN code separate from the sales transaction. The cash card is not encoded or encrypted with any personal user information (e.g., name, date of birth, social security number, etc.).

The problem of identity theft is a growing concern for Internet users and consumers. This card system provides electronic purchasing power without revealing any personal information. At the same time, immediate payment to the retailer or seller is ensured.

The card system of the invention is designed to clear through an issuer, like a bank, credit union, financial institution, or other commercial agency, where the cash card is purchased. The card is designed to have an unlimited or limited life. It can be renewed or "reloaded" upon the payment of cash or transfer of funds. The credit- or debit-type plastic card can comprise a magnetic stripe or electronic chip. An electronic device (similar to a mini-calculator), displaying the account balance, can also be used as a cash card. The type of card used will depend on the issuer's preference and the amount the purchaser wishes to spend in order to belong to a particular cash card system. Financial institutions will report all cash transactions in excess of $10,000, as required by law. Retailers and sellers will obtain personal information if a purchaser completes a transaction in excess of $10,000, as currently required in regular cash transactions.

The use of traveler's checks is a cashless system similar to the invention. Traveler's checks contain identification numbers identifying the purchaser and the cash amount. Should any one of the checks become lost or stolen, the purchaser can call the issuing bank or American Express, and obtain a refund. The purchaser is given a receipt with the identification numbers disposed on the checks, and is instructed to maintain the receipt separate from the checks. This system incorporates the best features of credit cards, traveler's checks, and cash: the anonymity of cash, the security of traveler's checks, and the convenience of credit and debit cards.

SUMMARY OF THE INVENTION

In accordance with the present invention, a card system is described in which two separate cards are issued to the user. A magnetic stripe, bar code, or chip is disposed on the back of each card. As used herein, the term "electronic" is meant to include any optical, magnetic, electrical, mechanical, or electronic means by which information is stored, accessed, or transferred with the use of computer technology. The stripe on the cash card contains the requisite information for "clearing" it at any bank or retailer. At the time of the initial purchase, a second card is issued. The second card is a security card containing the cardholder's account number and the selected PIN. This card is for retrieval of funds only, not for purchases. The user purchases goods or services worth a given dollar amount with the cash card at any participating retail establishment, and the cash purchase is debited from the account. This procedure is similar to telephone card systems allowing minutes to be pre-purchased.

The purchaser can pay for the electronic funds by cash, check, or electronic transfer. Once the cash card is electronically loaded, the user can then use the cash card at any participating sales establishment simply by using the selected PIN to approve purchases. The user types in the PIN to activate and approve the purchase. Purchase of goods or services are validated by a subscribing retailer who swipes the cash card through a card reading machine, verifying the PIN provided by the cardholder. The amount of the purchase is immediately electronically debited from the cardholder's account. A running balance is maintained by the card issuer (bank, credit union, financial institution, etc.).

In an alternate embodiment, the two-card system can be used as a more conventional credit card, in which purchases are encoded on the cash card upon use, and the security card provides the same functions hereinbelow described.

In the event of loss of the cash card, it can be replaced by presenting the security card with its identifying PIN code and the user identification or account number contained in the security card. The term "identification," as used herein, is intended to mean non-personal information, but does not necessarily exclude personal information. The PIN is encoded or encrypted within both cards so unauthorized individuals cannot easily determine it. People using the card system will be instructed to keep the security card separated from the cash card, in order to foil theft and misappropriation. The security card would be best left at home. Should the cash card fall into alien hands, improper or unauthorized use of the cash card would be prohibited by virtue of the need to key-in the correct PIN when swiping the cash card for purchasing goods or services at the participating retailer.

It is an object of the present invention to provide an improved cash card system.

It is another object of this invention to provide a cash card system affording the user a combined increase in security, convenience, and anonymity with the card's use than with any financial transaction system currently in use.

DESCRIPTION OF THE PREFERRED EMBODIMENT

Generally speaking, the invention features a cash card system having two card-like elements that respectively provide cash and security features. A PIN number is encrypted or encoded on each card. Only the correct PIN number will provide access and validation for transactions using either card. The identification code or account number encoded on the security card is tied to the PIN number. If there is a loss or theft of the cash card, the remaining balance in the account will be reimbursed by presenting the security card to the issuer (bank, financial institution, etc.).

The cash card of the two-card system contains electronic cash purchased at a participating bank or agency. The user purchases a dollar amount for the cash card, which is electronically loaded therein. This procedure is similar to telephone card systems allowing minutes to be pre-purchased. The purchaser can pay for the electronic cash by cash, check, or electronic transfer of funds. Alternatively, the cash card can be used as a conventional credit card with no pre-deposited balance. Once the cash card is electronically loaded, in the preferred embodiment, the user can then use it at any participating sales establishment simply by using an assigned PIN to validate purchases. The retailer swipes the cash card containing the encrypted PIN both to validate the PIN and to debit the amount of the purchase. The cardholder types in the PIN to activate or approve a purchase. The amount of the purchase is electronically debited from the account. The participating bank keeps a running account balance by assigning each purchase an invoice number or transaction code.

In the event of loss or theft, the cash card cannot be used without the PIN number. People using the card system will be instructed to keep the security card separated from the cash card (i.e., leave the security card at home).

The PIN will be extremely difficult to crack. The PIN number is not obtainable by a stranger from either card, because the PIN number is encrypted or encoded. It is contemplated the PIN of this invention would contain an alphanumeric expression only the cardholder or purchaser would know. Alphanumeric expressions, even if restricted to only four digits and letters, present a combination many times more difficult to crack than mere numerical symbols. Symbols, such as an asterisk, can also be part of the PIN.

The cash card system of this invention operates only by use of a PIN. No personal identification information is required for the purchase or use of the cash card. No signature, other than the numerical PIN signature, is required. The retailer is not obliged to accept the cash purchase unless the cardholder has sufficient funds in the encoded account of the cash card.

The cash card system of this invention affords persons anonymity, convenience, and security. The user enjoys the same anonymity and protections of cash purchases without having to carry cash. The user also enjoys the convenience and freedom of card usage, such as paying at the gas pump. A user need not apply for credit, and is not subject to "hits" on his or her credit records. The government, retailers, or other institutions cannot easily track purchases, card usage, its purposes, the transaction locations, or the identity of the user, thus replicating the freedom currently afforded with the use of cash.

Internet purchases are protected because PINs are required when using the card. The card system protects a person's identity because the user does not provide personal information when purchasing the cash card or when transacting business over the Internet.

The card system of the invention is designed to clear through a cardholder's bank, credit union, financial institution, or other commercial agency where the cash card is purchased. The card is designed to have either a limited or unlimited life. It can be renewed or "reloaded" upon the payment of cash or transfer of funds. Alternately, the card can be encoded or encrypted so it expires after a designated period of time.

The credit- or debit-type plastic card can comprise a magnetic stripe or electronic chip containing the electronic information. A small electronic device, similar to a mini-calculator, displays the running account balance, and can also be used as a cash card. The type of device used will depend on the issuer's preference and the amount the purchaser wishes to spend in order to belong to a particular cash card system.

A number of types of "cards" are available for use in this system. The cards can be similar in size and configuration to standard debit or credit card. A bar code system can be used with conventional scanners. The card can be in the form of a key chain, bracelet, ring, or mini-card employing a magnetic strip or bar code. Alternatively, the card may not be a card at all, but could be any magnetic or electronic device that can be encoded with stored information, and can be scanned or read. For instance, the card can take the form of a credit card-sized calculator able to display one's current available limits. PIN authorization allows the purchase amount to be electronically transferred into the retailer's account.

Small, handheld swipe readers, fixed location swipe systems, and scanning systems (e.g., bar code scanners) are also readily available and in use.

The cash card system is not like a credit card requiring creditworthiness. Thus, people with poor credit can still use the inventive system. It is the equivalent of cash, but with safety, convenience, anonymity, and availability for all users, including those not creditworthy.

In the event of loss of the security card, the cash card can still be used as long as the proper PIN is employed. If the cash card is lost or stolen, the security card can be used to obtain a new cash card or redeem the remaining funds. If a new cash card is issued, a new PIN can be selected by the user. The PIN would be required to verify that the recipient is the proper party to which the new cash card belongs. Future purchases can be made using the replacement card and new PIN.

For security purposes, the cash card and the security card can be taken to any participating network institution (bank, etc.) for selection and/or replacement of a new PIN. Naturally, the existing PIN would be required to make this change.

A partially used, lost cash card can be replaced with a new card having the remainder of the funds if the user can verify his or her PIN number. Replacement is accomplished by presenting the security card to a participating network institution (e.g., bank) and verifying the PIN number encoded therein. The running balance is easily maintained and verified by assigning a transaction number or code to each purchase.

The invention is not limited to one cash card and one security card. One security card is issued, but multiple cash cards may be issued with the same account and PINs. For instance, a husband and wife may each possess a cash card for the same account, employing identical PINs.

This system will help make possible a cashless society. It is expected to be a boon for banks and other card issuers because it allows them to float large amounts of cash that they will have on hand, but will not have to pay out until the card owner makes a purchase. The amount of money an issuer can make in overnight interest has great potential for commercial establishments.

The cash card system will also benefit retailers. In the event merchandise is returned or a retailer refund is due, the retailer will have the option of refunding cash or reloading the card for the amount of the return or refund. Additionally, retailers will benefit because employee theft will be virtually eliminated, as there will be an electronic transaction recording payment for goods or services, unlike cash transactions.

Other modifications and changes varied to fit particular operating requirements and environments will be apparent to those skilled in the art. The invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A cash card system having a pair of uniquely associated electronic instruments adapted for complementary, non-identical, independent operation, comprising:
   a) a first electronic instrument comprising a card having a first group of predetermined information electronically associated therewith and adapted for performing a financial transaction; and
   b) a second electronic instrument comprising a card having at least a subset of said first group of predetermined information electronically associated therewith, said second electronic instrument being adapted for performing only at least one of the transaction types: a security transaction, and a recovery transaction;
   both said first and said second electronic instruments adapted to be in the possession of a user thereof.

2. The cash card system as recited in claim 1, wherein at least one of said first and said second electronic instruments further comprises an electronic calculator.

3. The cash card system as recited in claim 1, wherein at least one of said first and said second electronic instruments comprises at least one of the information storage devices: a magnetic stripe, a microchip, and an optically readable code.

4. The cash card system as recited in claim 3, wherein said first group of predetermined information comprises clearance information related to an institution issuing said first and said second electronic instruments.

5. The cash card system as recited in claim 3, wherein said first group of predetermined information comprises a PIN.

6. The cash card system as recited in claim 5, wherein said subset of said first group of predetermined information electronically associated with said second electronic instrument comprises said PIN.

7. The cash card system as recited in claim 5, wherein said PIN comprises at least one of the group: alphanumeric characters, and symbols.

8. The cash card system as recited in claim 7, wherein said alphanumeric characters and symbols are in at least one of the categories: unencrypted plaintext, encrypted, and encoded.

9. The cash card system as recited in claim 3, wherein only said first electronic instruments comprises a cash card.

10. The cash card system as recited in claim 9, wherein said cash card may be replenished.

11. The cash card system as recited in claim 10, wherein said replenishment of said cash card requires the use of said second electronic instrument to perform a security transaction.

12. The cash card system as recited in claim 9, wherein said first group of predetermined information electronically associated with said cash card comprises an available cash balance.

13. The cash card system as recited in claim 12, wherein said available cash balance is altered when said cash card is used to perform a financial transaction.

14. A method for using a prepaid, cash card system wherein prepaid funds may be recovered from a lost or stolen cash card, the steps comprising:

a) issuing a set of associate electronic instruments to a purchaser, said set of electronic instruments comprising a first electronic instrument comprising a card having a first group of predetermined information electronically associated therewith and adapted for performing a financial transaction, and at least a second electronic instrument comprising a card having at least a subset of said first group of predetermined information electronically associated therewith, said second electronic instrument being adapted for performing only a security transaction;

b) associating a predetermined cash value with said first electronic instrument, thereby creating a cash balance;

c) using said first electronic instrument to perform a financial transaction having a transaction cash value smaller or equal to said cash balance;

d) decreasing said cash balance by said transaction cash value; and e) repeating said using step (c) and said decreasing step (d).

15. The method for using a prepaid, cash card system wherein prepaid funds may be recovered from a lost or stolen cash card as recited in claim 14, the steps further comprising:

f) if said first electronic instrument becomes unavailable, utilizing said second electronic instrument to recover said cash balance associated with said first electronic instrument.

16. The method for using a prepaid, cash card system wherein prepaid funds may be recovered from a lost or stolen cash card as recited in claim 14, the steps further comprising:

f) adding an additional cash value to said first electronic instrument and increasing said cash balance by substantially the amount of said additional cash value.

17. The method for using a prepaid, cash card system wherein prepaid funds may be recovered from a lost or stolen cash card as recited in claim 16, wherein said second electronic instrument is required to perform said adding step (f).

* * * * *